United States Patent [19]

Zorev et al.

[11] 4,189,318

[45] Feb. 19, 1980

[54] FLUX FOR USE IN CENTRIFUGAL CASTING OF BIMETALLIC PIPES

[75] Inventors: Nikolai Zorev; Nikolai N. Alexandrov; Gennady S. Strizhov; Genrikh S. Mirzoian, all of Moscow; Gennady M. Slepnev, Moskovskaya; Gleb S. Akubov, Izhevsk; Evgeny V. Gerlivanov, Izhevsk; Vladimir M. Lvov, Izhevsk; Viktor G. Tinyakov, Moscow, all of U.S.S.R.

[73] Assignee: Nauchno-Proizvodstvennoe Obiedinenie Po Tekhnologii Mashi-Nostroenia "Tsniitmash", Moscow, U.S.S.R.

[21] Appl. No.: 923,942

[22] Filed: Jul. 11, 1978

[30] Foreign Application Priority Data

Jul. 15, 1977 [SU] U.S.S.R. .......................... 2507556[U]

[51] Int. Cl.$^2$ ................................................ C22B 9/10
[52] U.S. Cl. ........................................ 75/257; 75/53
[58] Field of Search ...................................... 75/53–58, 75/257; 148/26

[56] References Cited

U.S. PATENT DOCUMENTS

| | | | |
|---|---|---|---|
| 3,272,667 | 9/1966 | Siegle | 148/26 |
| 3,340,107 | 9/1967 | Ballass | 148/26 |
| 3,704,744 | 12/1972 | Halley | 148/26 |
| 3,827,880 | 8/1974 | Greeson | 75/257 |
| 3,841,923 | 10/1974 | Dudko | 75/257 |
| 3,871,875 | 3/1975 | Yokota | 75/53 |
| 4,038,067 | 7/1977 | Takeuchi | 75/53 |

*Primary Examiner*—Peter D. Rosenberg
*Attorney, Agent, or Firm*—Haseltine, Lake & Waters

[57] ABSTRACT

Disclosed is a flux intended for use in centrifugal casting of bimetallic pipes and comprising calcium oxide, silicon oxide, boron oxide, sodium oxide and sodium fluoride, said components being contained therein in the following amounts:

Percent by weight
  CaO, the base
  $SiO_2$: ... 7 to 10
  $B_2O_3$ ... 10 to 12
  $Na_2O$ ... 18 to 24
  NaF ... 20 to 25

2 Claims, No Drawings

FLUX FOR USE IN CENTRIFUGAL CASTING OF BIMETALLIC PIPES

BACKGROUND OF THE INVENTION

1. Field of the Application

The present invention relates to centrifugal casting, and more particularly to a flux intended for use in centrifugal casting of bimetallic pipes.

The invention can be advantageously used in the production of compound centrifugal tubular steel castings the external layer of which are made of pearlitic steels and the internal of austenitic steels.

The invention makes it possible to manufacture bimetallic pipes by centrifugal casting from pearlitic and austenitic steels with the length-to-diameter ratio thereof being 8 to 10, while ensuring sound and uniform welding of these metals over the entire length of the casting and refining of the metals, i.e. removing non-metallic inclusions therefrom.

2. Description of the Prior Art

The production of bimetallic pipes by centrifugal casting for the need of various branches of industry is increasing on an ever greater scale in industrially developed countries the world over. The metal obtained by the method of centrifugal casting has mechanical-and-physical properties similar to those possessed by the forged metal, whereas the production process in the former case is less labor-consuming.

The problem of producing bimetallic pipes by centrifugal casting, with the length-to diameter ratio thereof being more than 8 to 10, lies in the difficulty of obtaining sound and uniform welding of the two metals throughout the casting length. One of the most important factors in the process of obtaining a high-quality external layer of steel and forming strong bonding of two metals in the compound casting is an appropriate selection of an optimum composition of flux having special physical-and-chemical properties.

It is known to select flux for each separate bimetallic compound, the flux composition depending upon the type of steel in the external layer, as well as upon the conditions of casting and pouring said steel into an iron mold.

The fluxes used in the production of compound centrifugal tubular castings should possess the following chemical-and-physical properties: the ability to refine the internal layer of metal/remove non-metallic inclusions therefrom when poured into an iron mold/; to be active or to be able to dissolve the oxide film formed on the internal surface of the external layer of metal and to prevent its oxidation and air cooling; its melting temperature, viscosity and density should be minimal, as well as its adhesion to the first or external layer of metal.

Making provision for all the above-mentioned properties of flux, requisite for the selection of its optimum composition having important bearing on the production of bimetallic pipes by centrifugal casting, it becomes feasible to substantially improve the quality of metal bonding while simultaneously increasing the length of the cast pipe.

In modern practice of producing bimetallic pipes from pearlitic and austenitic steels by the method of centrifugal casting use is made of fluxes having the following oxide-salt systems: $CaF_2$-$Na_2O$-$CaO$-$SiO_2$-$B_2O_3$-$Al_2O_3$-chlorites (cf. USSR Inventors' Certificates No. 238,107, No. 358,075, Nos. 409,781, 309,773, U.S. Pat. No. 3,414,044, etc.,).

The compositions of fluxes mentioned above fail to have any favorable effect on the process of centrifugal casting of bimetallic pipes from austenitic and pearlitic steels, with the length-to-diameter ratio thereof being more than 8 to 10, because of the low activity of these fluxes with respect to the oxide film formed on the internal surface of the external layer of metal, and also because of high melting temperature and excessive adhesion thereof to the external metal (800 to 1200 erg/$cm^2$).

The fluxes containing chlorites are unsuitable for use in centrifugal casting because of their high toxicity, which greatly deteriorates health conditions of work.

SUMMARY OF THE INVENTION

It is therefore an object of the present invention to obviate the above disadvantages.

Another object of the invention is to provide a flux of such composition that will possess optimum chemical-and-physical properties suitable for the production of bimetallic pipes from pearlitic and austenitic steels by centrifugal casting, with the length-to-diameter ratio thereof being more than 8 to 10.

These objects of the invention are accomplished by the provision of a flux comprising sodium fluoride in addition to calcium oxide, silicon oxide, boron oxide and sodium oxide, said components being contained therein in the following amounts:

Percent by weight
CaO, the base
$SiO_2$ ... 7 to 10    $B_2O_3$ ... 10 to 12
$Na_2O$ ... 18 to 24
NaF ... 20 to 25

The flux according to the invention for use in centrifugal casting of bimetallic pipes from pearlitic and austenitic steels, with the length-to-diameter ratio thereof being more than 8 to 10, permits sound and uniform welding of the metals to be ensured over the entire length of the casting and non-metallic inclusion to be removed therefrom.

In addition, the flux of the invention does not become toxic at metal casting temperatures, its melting temperature ranges from 800° to 870° C., the flux adhesion to the external metal, i.e. to pearlitic steel, being 500 to 560 erg/$cm^2$. The flux is easily removable from the internal surface of the cast pipe by means of light knocking, whereby the performance of a cutting tool is not affected during mechanical treatment of cast pipes.

BRIEF DESCRIPTION OF THE INVENTION

The invention will be further described with reference to illustrative Examples.

When producing bimetallic pipes by the method of centrifugal casting, the powdered flux containing CaO, the base, 20 to 25 wt.% NaF, 7 to 10 wt.% $SiO_2$, 10 to 12 wt.% $B_2O_3$, 18 to 24 wt.% $Na_2O$ was fed onto the external layer of the molten metal flow. Owing to the high temperature of the molten metal, the flux is melted down and is then flown out onto the internal surface of the first metal, thereby refining the latter and removing oxide film from its internal surface and thus protecting the surface from air oxidation. When the second layer of metal is poured, the flux is easily removed therewith from the internal surface of the first layer of metal, thereby refining the second layer.

Several fluxes were tested in the course of centrifugal casting of bimetallic pipes in which the external layer was composed of pearlitic steel and the internal layer of austenitic steel. The best results were obtained with the use of fluxes having the following compositions:

EXAMPLE 1

The flux contained 45% CaO, 20% NaF, 7% $SiO_2$, 10% $B_2O_3$, 18% $Na_2O$. The flux initial melting temperature was 870° C., and its adhesion to pearlitic steel was 500 erg/cm$^2$.

EXAMPLE 2

The flux contained 38% CaO, 22% NaF, 9% $SiO_2$, 11% $B_2O_3$, 20% $Na_2O$. The flux initial melting temperature was 840° C., and its adhesion to pearlitic steel was 530 erg/cm$^2$.

EXAMPLE 3

The flux contained 29% CaO, 25% NaF, 10% $SiO_2$, 12% $B_2O_3$, 24% $Na_2O$. The flux initial melting temperature was 800° C., and its adhesion to pearlitic steel was 500 erg/cm$^2$.

The introduction of sodium fluoride into flux permits the flux activity with respect to aluminum and silicon oxides, contained in oxide film, to be increased and the flux melting temperature and viscosity to be lowered. An increase in the amount of sodium fluoride in the flux composition above 25 percent sharply increases the strength of the flux adhesion to the external layer of metal, as well as its activity with respect to a refractory lining. With the content of sodium fluoride in the flux composition being less than 20 percent, the flux activity is impaired and its viscosity and melting temperature are increased.

Calcium oxide contained in the flux substantially effects its adhesion to the external layer of steel and ensures better refining of the metal and easier transfer of silicon and manganese oxides from the oxide film to the flux. An increase in the amount of calcium oxide in the flux composition decreases its adhesion to the external layer of metal, enhances its refining power, but considerably raises the flux melting temperature. With the minimum content of calcium oxide in the flux composition, the flux adhesion strength is drastically increased, while its refining power and melting temperature are lowered. Therefore, the content of calcium oxide in the flux composition should preferably range from 29 to 45 percent.

Silicon oxide and boron oxide promote bonding and transition of iron oxide from oxide film to flux, boron oxide playing a more effective role in this. The content of boron oxide in the flux of the invention is restricted to 10–12 percent, since an increase in the amount of boron oxide above this limit will result in the impairment of the corrosion resistance of austenitic steels once saturated with boron. Boron oxide permits the flux melting temperature and its density to be lowered and the strength of the flux adhesion to be slightly enhanced. In view of the fact that the introduction of silicon oxide into the flux materially increases the flux viscosity and its adhesion to the external layer of metal, the upper boundary of the silicon oxide content in the flux of the invention is taken to be 10 percent.

By introducing sodium oxide into the flux composition, it becomes possible to lower the flux melting temperature and its viscosity, with the flux adhesion to metal and its activity with respect to a refractory lining markedly increasing. A decrease in the content of sodium oxide in the flux composition will, conversely, result in higher melting temperature and viscosity of the flux and in lower strength of its adhesion to the metal, as well as in lower activity with respect to the refractory lining. With this point in view, the upper and lower boundary of the sodium oxide in the flux have been selected to be 18 and 24, respectively.

From the above it follows that by using the flux according to the invention for casting bimetallic pipes, comprising calcium oxide, sodium fluoride, silicon oxide, boron oxide and sodium oxide in the amounts indicated above, it becomes feasible to achieve sound welding of pearlitic and austenitic steels, with the length-to-diameter ratio in the cast pipes being more than 8 to 10, ensuring at the same time refining of said steels or removing non-metallic inclusions therefrom.

What is claimed is:

1. A flux intended for use in centrifugal casting of bimetallic pipes and consisting essentially of calcium oxide, silicon oxide, boron oxide, sodium oxide and sodium fluoride, said components being contained therein in the following amounts:
percent by weight
  CaO, the base
  $SiO_2$ ... 7 to 10
  $B_2O_3$ ... 10 to 12
  $Na_2O$ ... 18 to 24
  NaF ... 20 to 25.

2. In the manufacture of bimetallic pipes having a length-to-diameter ratio of 8 to 10 from pearlitic and austenitic steels by centrifugal casting in the presence of a flux, the improvement whereby the flux consists essentially of in percent by weight,
  CaO, the base
  $SiO_2$ ... 7 to 10
  $B_2O_3$ ... 10 to 12
  $Na_2O$ ... 18 to 24
  NaF ... 20 to 25.

* * * * *